Oct. 17, 1933.  F. E. BESSLER  1,930,992
DISAPPEARING STAIRWAY
Filed Feb. 19, 1930  10 Sheets-Sheet 1

INVENTOR.
FRANK E. BESSLER.
BY Ely & Barrow
ATTORNEYS

Oct. 17, 1933.  F. E. BESSLER  1,930,992
DISAPPEARING STAIRWAY
Filed Feb. 19, 1930   10 Sheets-Sheet 2
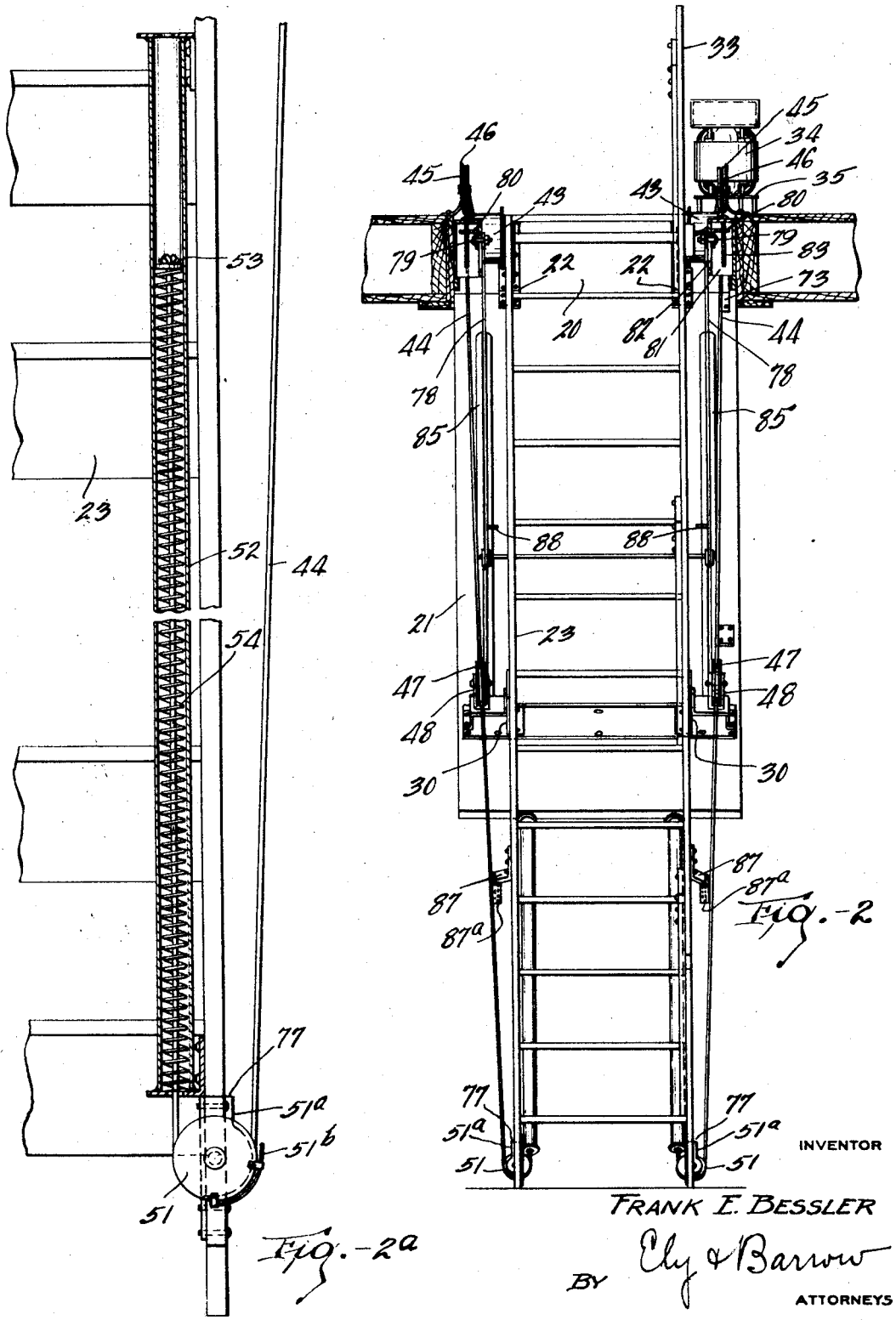
INVENTOR
FRANK E. BESSLER
BY Ely & Barrow
ATTORNEYS Oct. 17, 1933.　　　F. E. BESSLER　　　1,930,992
DISAPPEARING STAIRWAY
Filed Feb. 19, 1930　　10 Sheets-Sheet 3
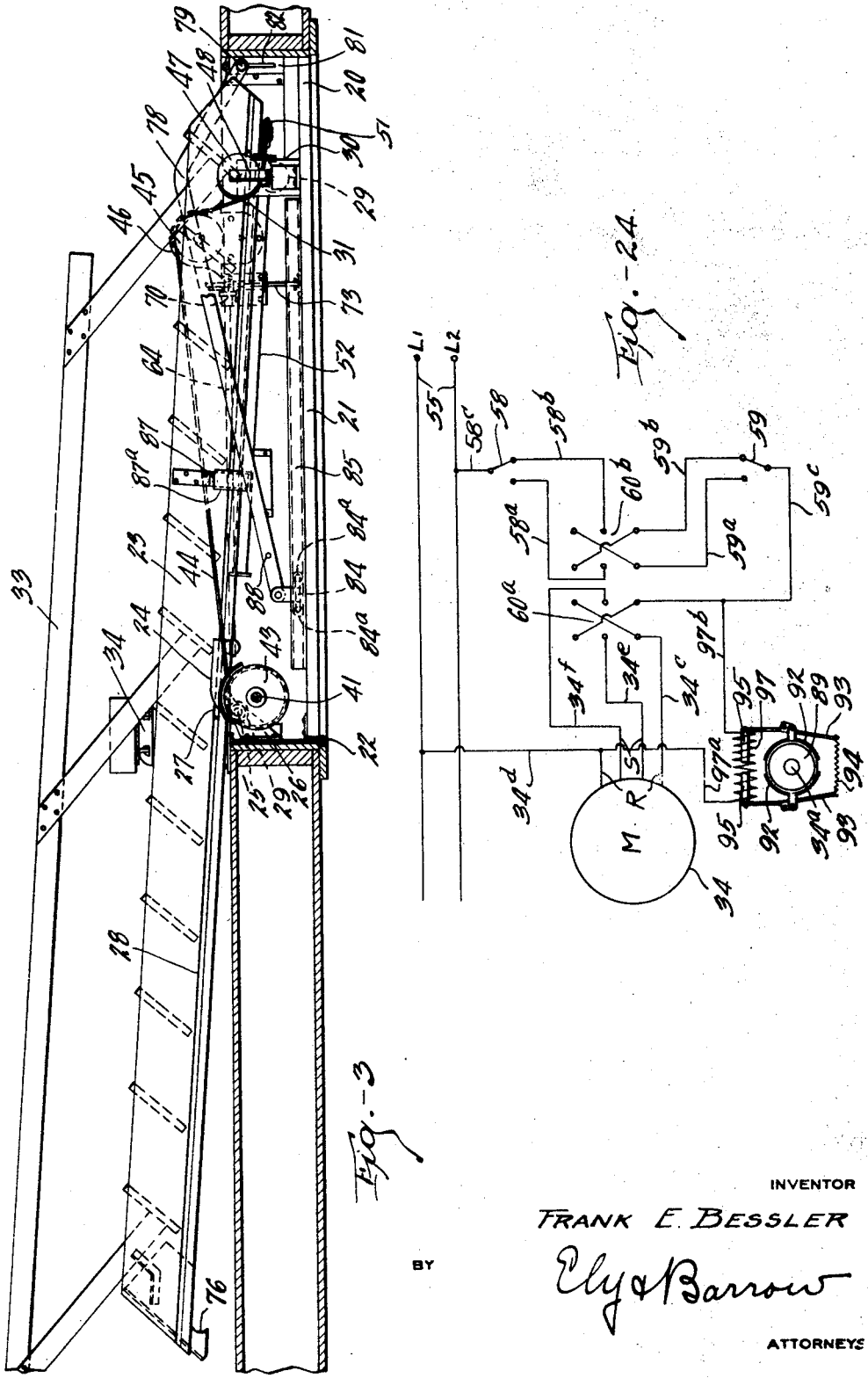
INVENTOR
FRANK E. BESSLER
BY
ATTORNEYS Oct. 17, 1933.    F. E. BESSLER    1,930,992
DISAPPEARING STAIRWAY
Filed Feb. 19, 1930    10 Sheets-Sheet 4
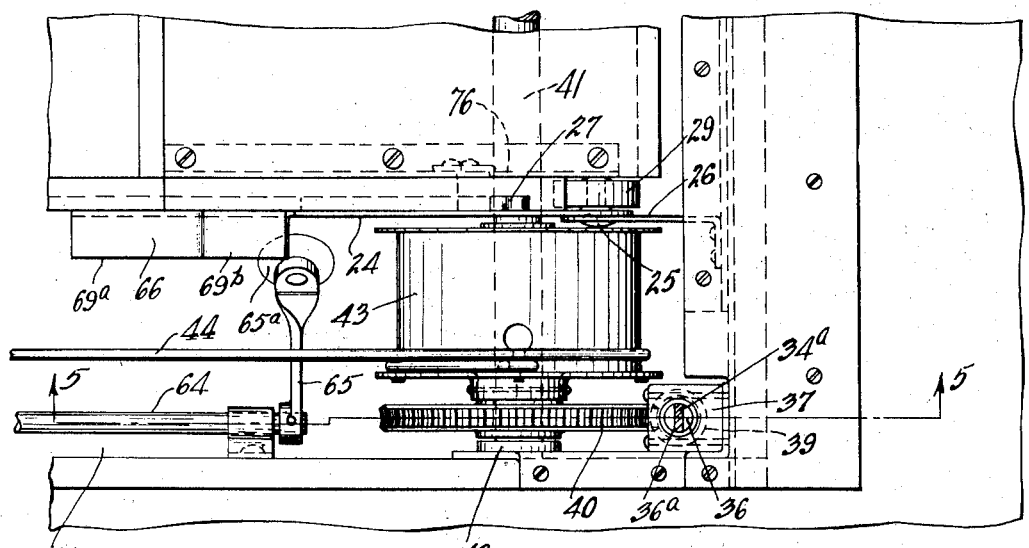
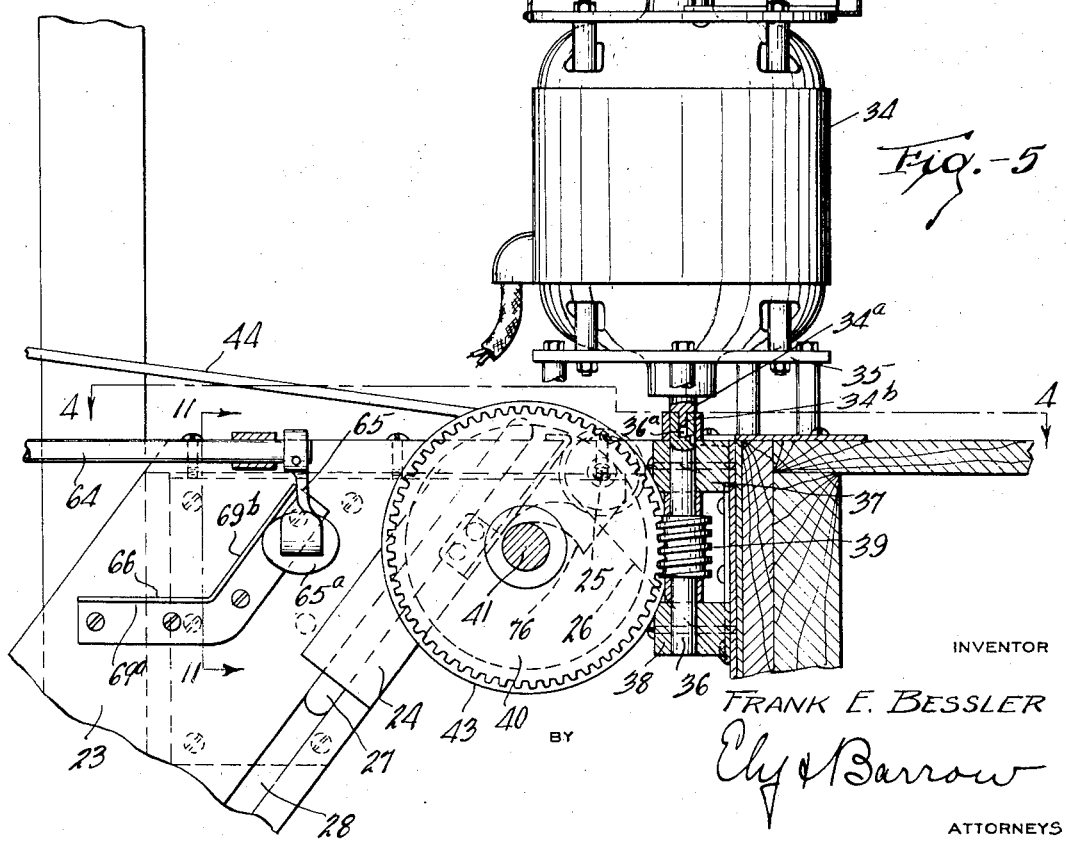
INVENTOR
FRANK E. BESSLER
BY
ATTORNEYS Oct. 17, 1933.　　　F. E. BESSLER　　　1,930,992
DISAPPEARING STAIRWAY
Filed Feb. 19, 1930　　10 Sheets-Sheet 5
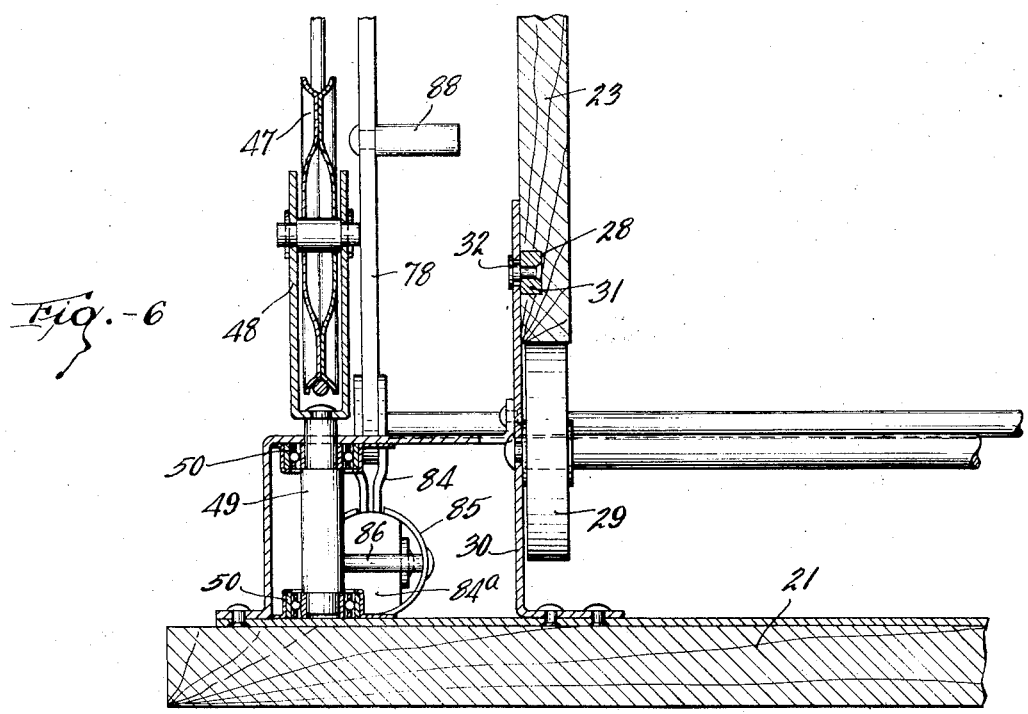
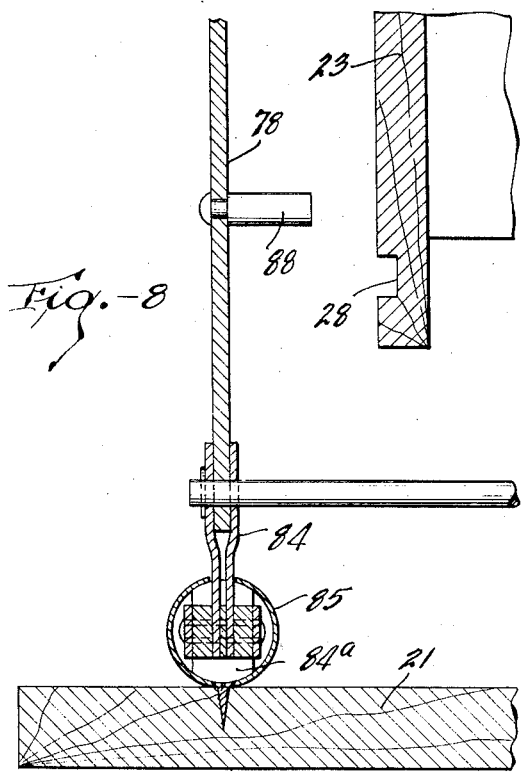
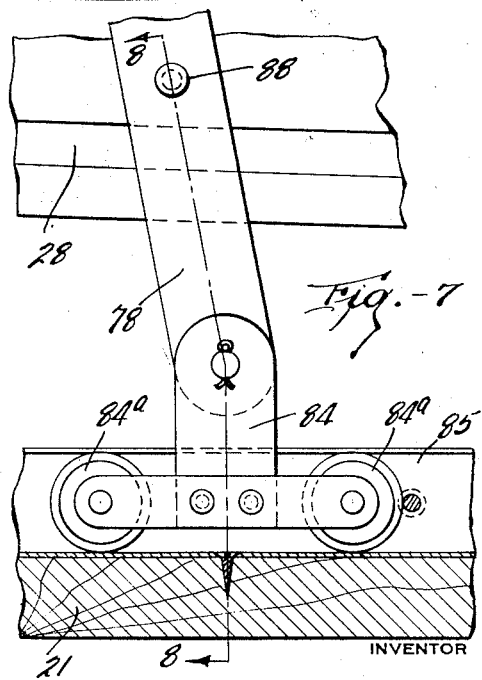
INVENTOR
FRANK E. BESSLER
BY
ATTORNEYS Oct. 17, 1933.  F. E. BESSLER  1,930,992
DISAPPEARING STAIRWAY
Filed Feb. 19, 1930  10 Sheets-Sheet 6
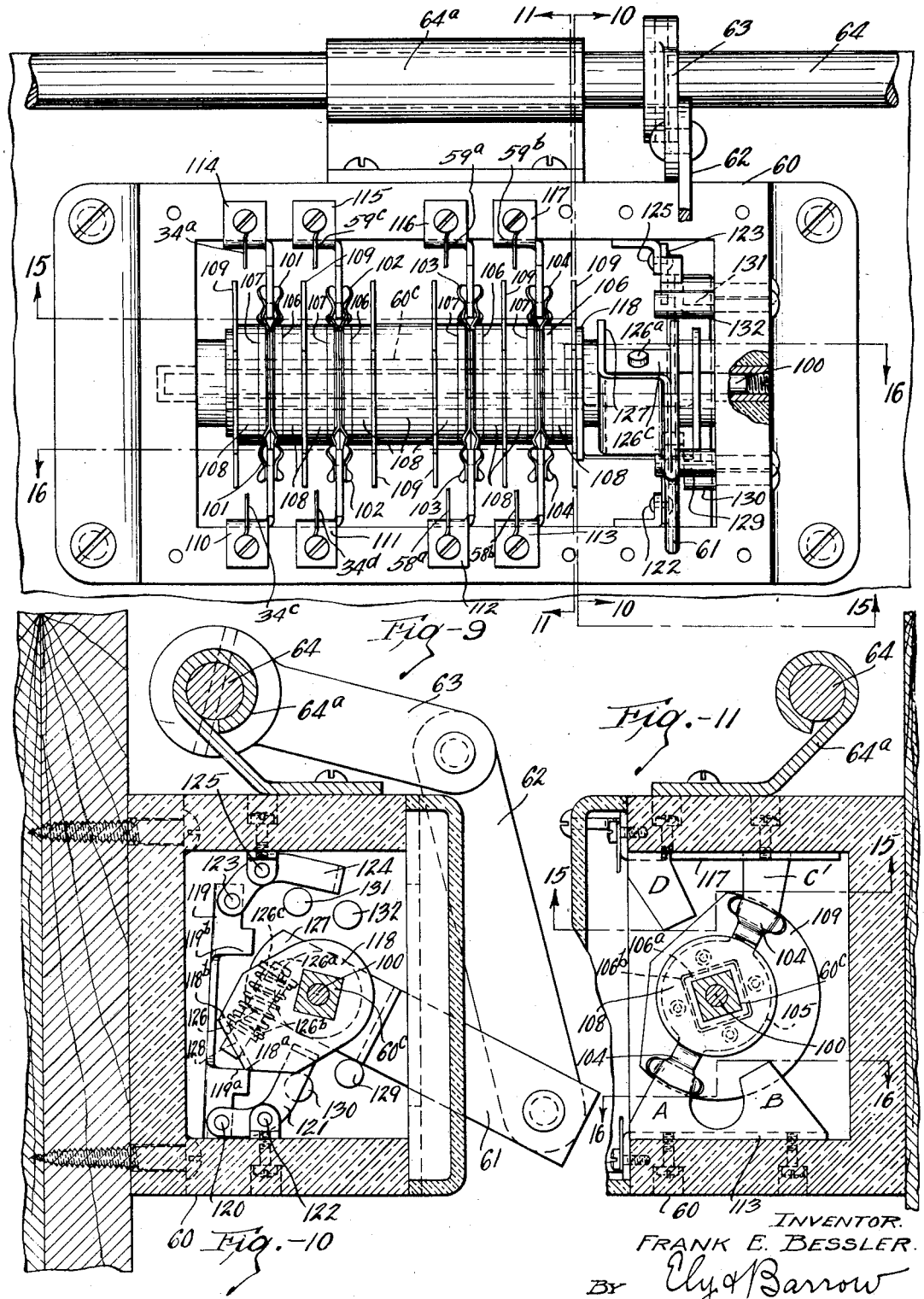
INVENTOR.
FRANK E. BESSLER.
By Ely & Barrow
ATTORNEYS Oct. 17, 1933.  F. E. BESSLER  1,930,992
DISAPPEARING STAIRWAY
Filed Feb. 19, 1930  10 Sheets-Sheet 7
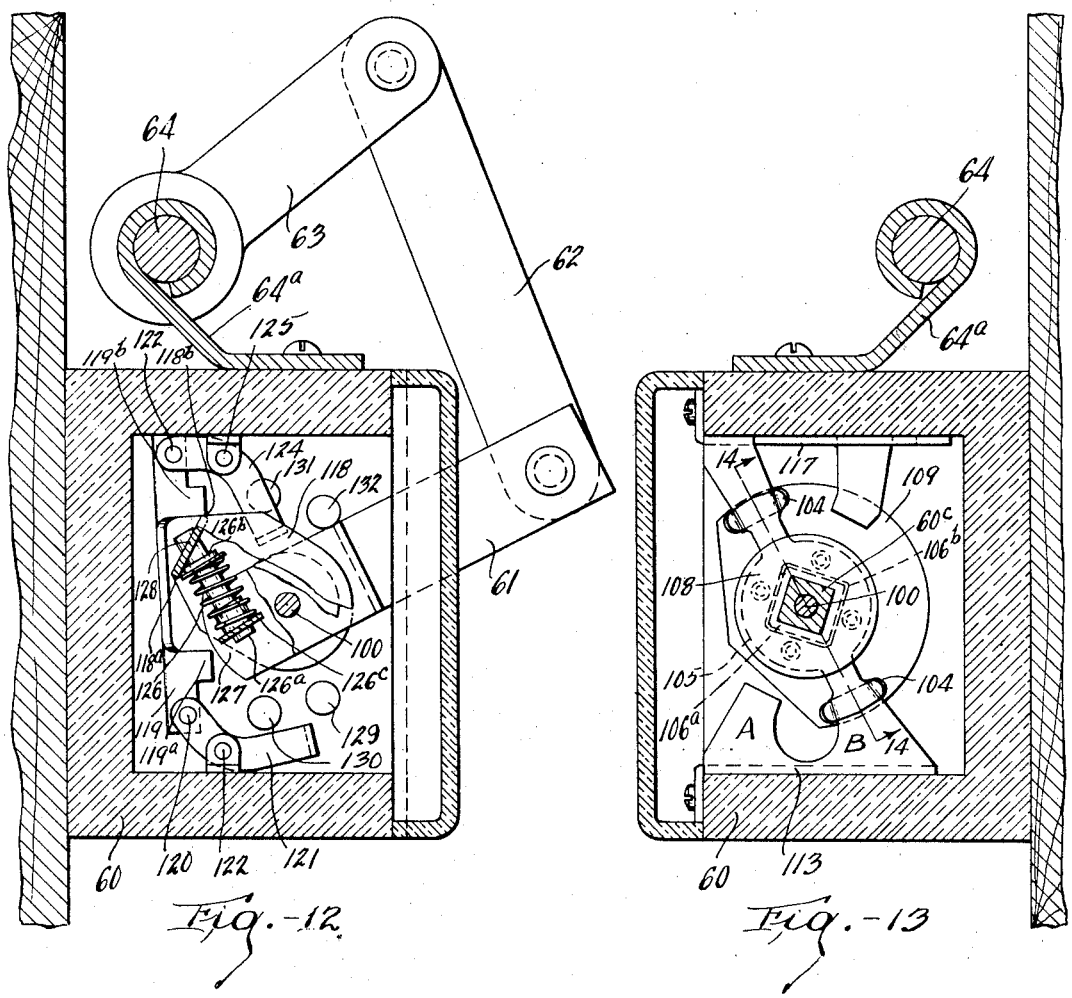
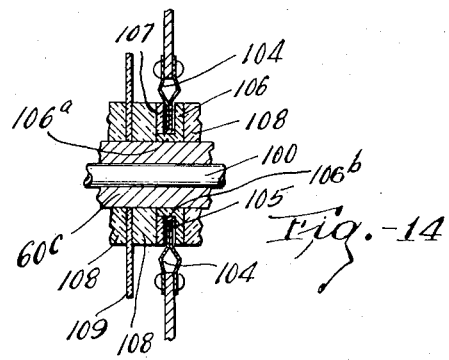
INVENTOR
FRANK E. BESSLER
BY
Ely & Barrow
ATTORNEYS Oct. 17, 1933.    F. E. BESSLER    1,930,992
DISAPPEARING STAIRWAY
Filed Feb. 19, 1930    10 Sheets-Sheet 8

INVENTOR
FRANK E. BESSLER
BY
ATTORNEYS.

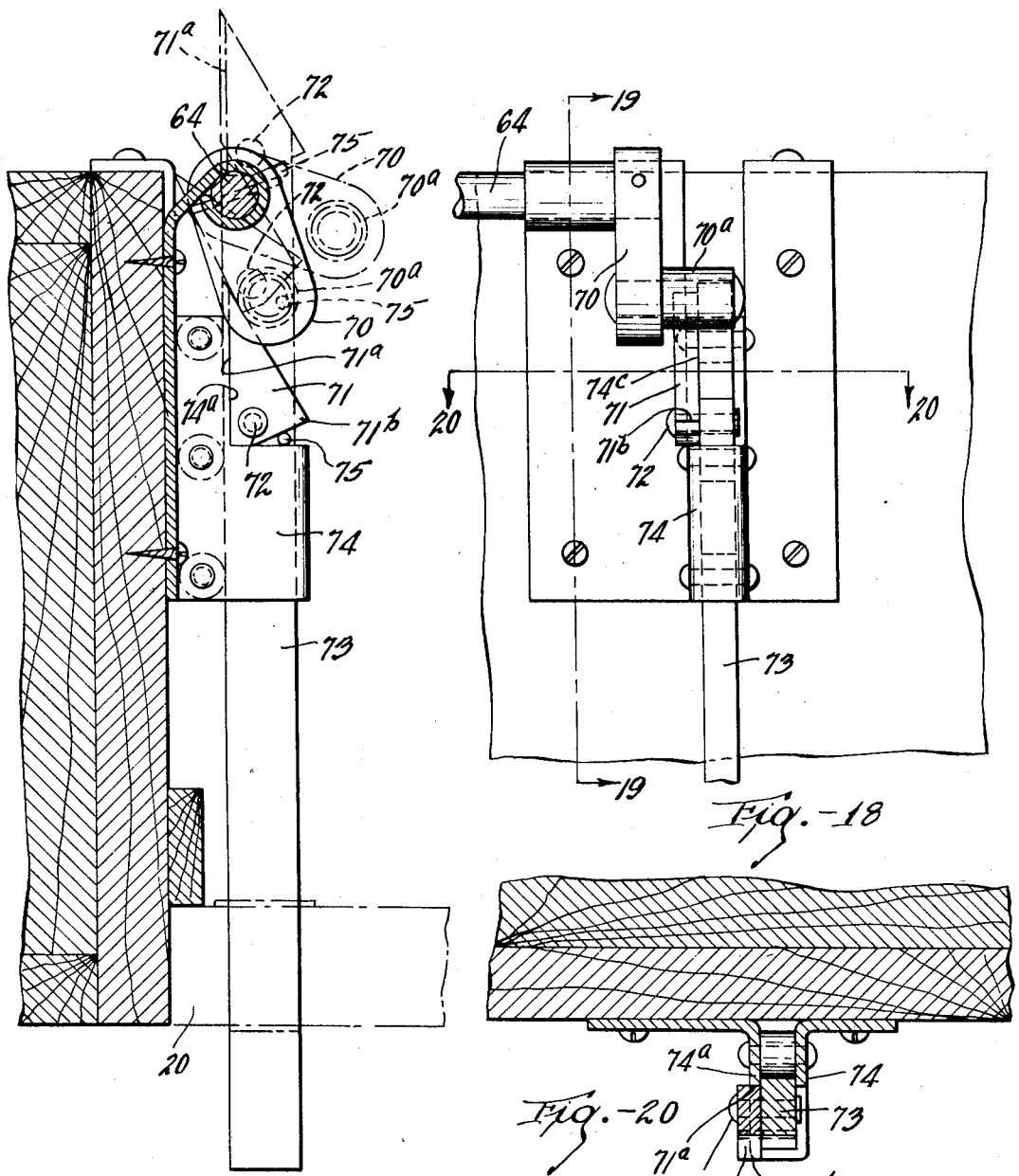

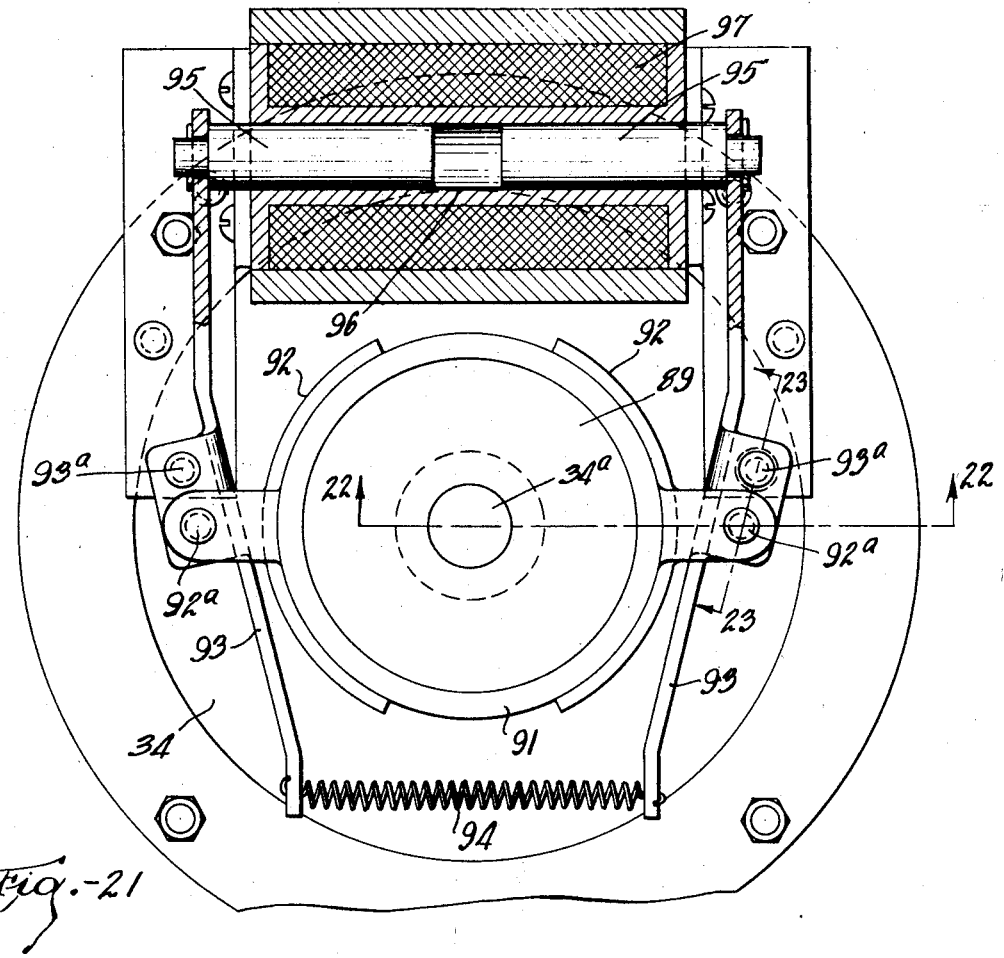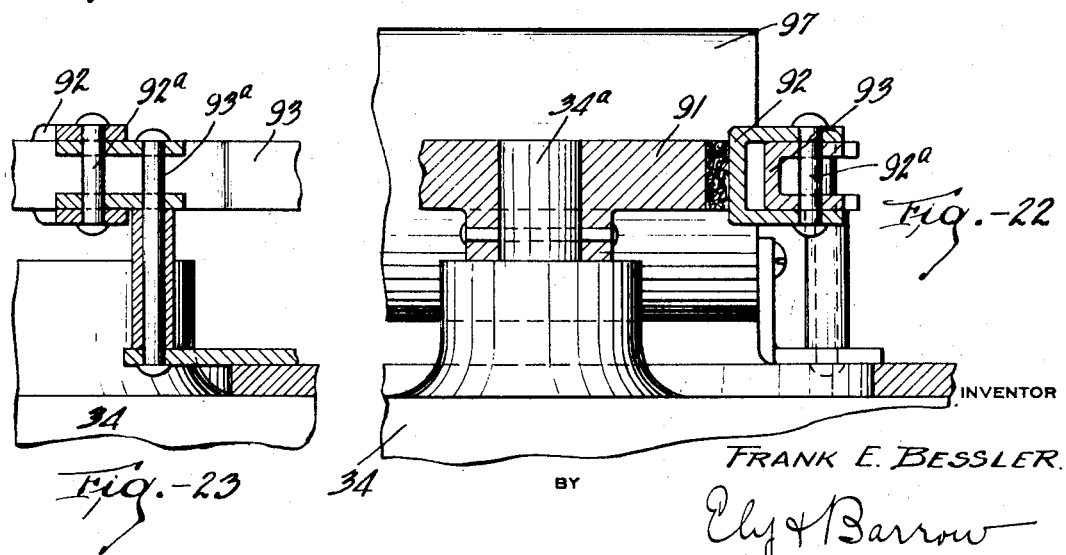

Patented Oct. 17, 1933

1,930,992

UNITED STATES PATENT OFFICE 1,930,992

DISAPPEARING STAIRWAY

Frank E. Bessler, Akron, Ohio, assignor to The Bessler Disappearing Stairway Company, Akron, Ohio, a corporation of Ohio Application February 19, 1930. Serial No. 429,614

11 Claims. (Cl. 228—50)

This invention relates to disappearing stairways.

The general purpose of the invention is to provide an improved disappearing stairway adapted for power operation. Heretofore, commercial disappearing stairways, so far as known have been manually operable, spring or weight balanced cable drums or the like being employed to reduce as much as possible the labor involved in actuating the stairway. This invention provides a stairway of this type operable by the mere manual manipulation of a control device such as a control switch.

Particularly the invention has for an object the provision of power means for actuating a stairway between a retracted position out of the way and an extended position of use, manual control means for starting the power means and means controlled by movement of the stairway into either of its positions to stop the power means and to set it for reverse operation so that upon again starting the power means the stairway will be actuated in the required way from retracted to extended positions or vice versa.

A further object of the invention is to provide means connecting the power means to the stairway for operating the latter in which a yielding device is incorporated to compensate for variations in the travel of the power means.

A further object of the invention is to provide automatic brake means operable as the power means is cut out to stop the power means.

The foregoing and other objects of the invention are attained in the disappearing stairway shown in the accompanying drawings and described below. It is to be understood that the invention is not limited to the specific form thereof shown and described.

Of the accompanying drawings,

Figure 2 is a sectional front elevation thereof on line 2—2 of Figure 1;

Figure 2ᵃ is an enlarged view, partly in section, of the lower right corner of Figure 2;

Figure 3 is a sectional side elevation thereof when retracted.

Figure 1:
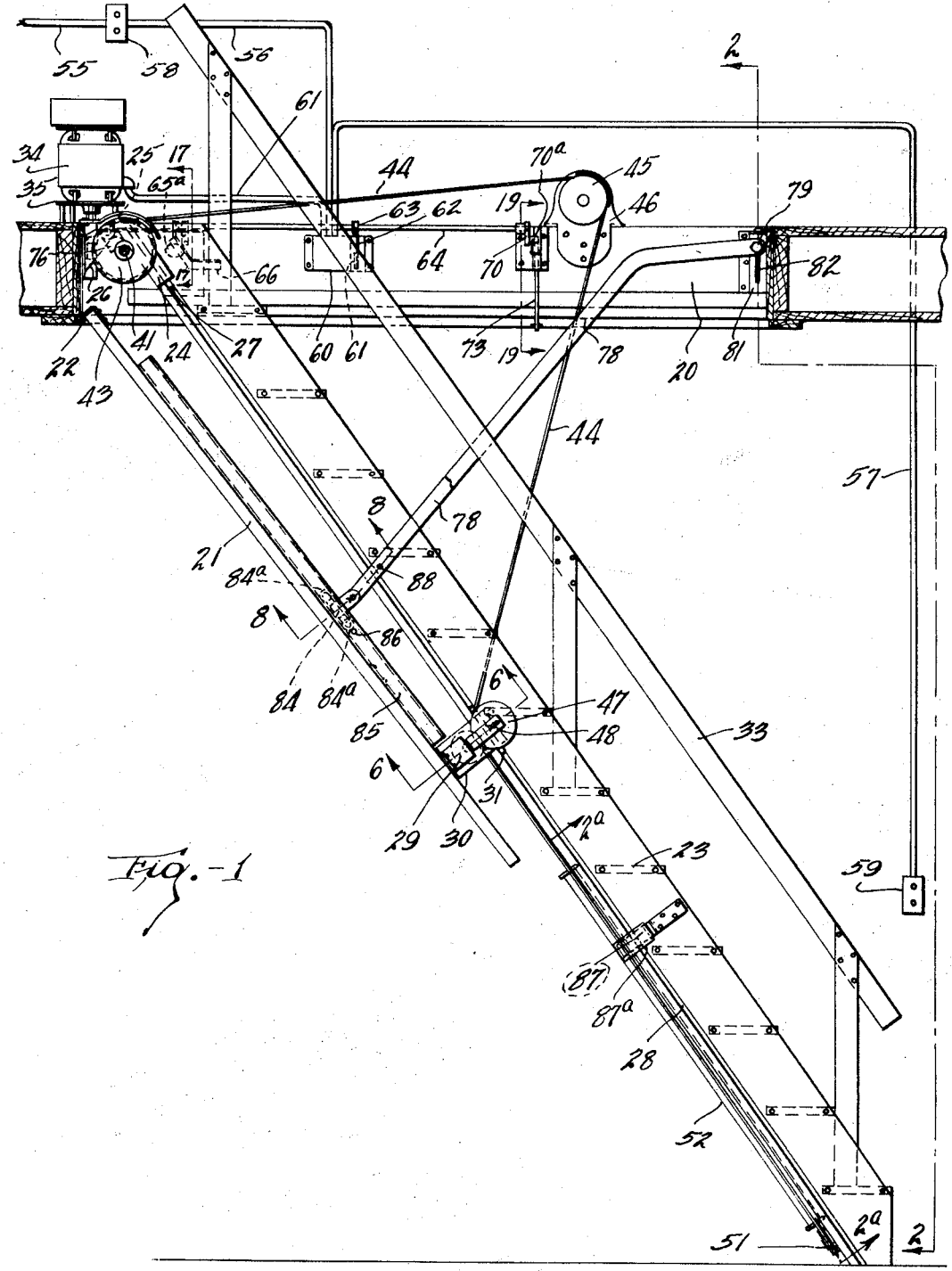
Figure 1 is a sectional side elevation of a disappearing stairway embodying the invention shown installed in a ceiling opening between floors of a building and extended for use.
Figure 15:
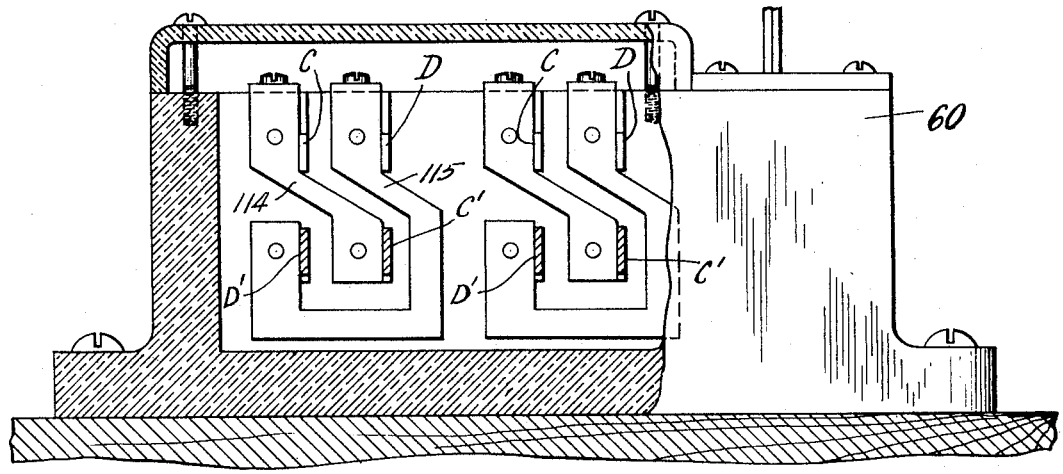
Figure 16:
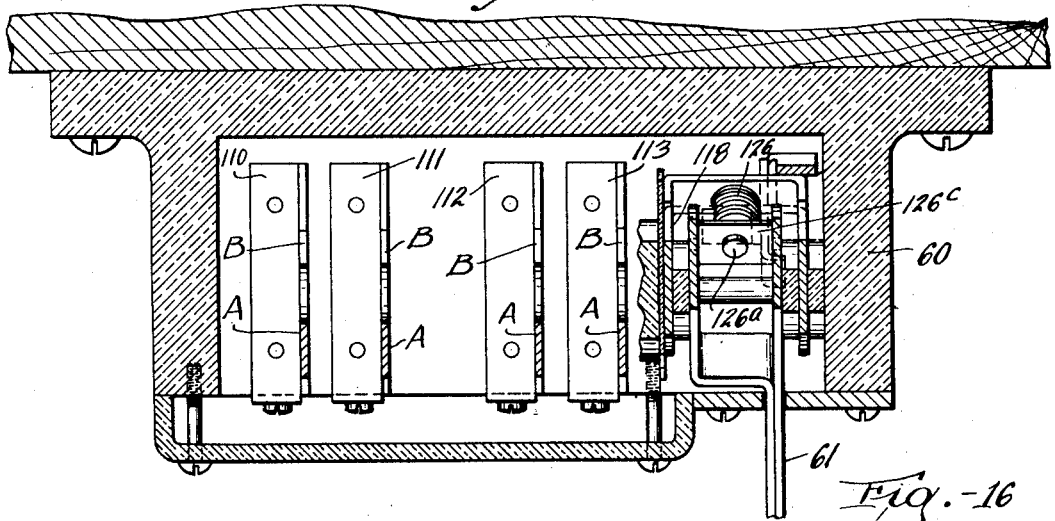
Figure 17:
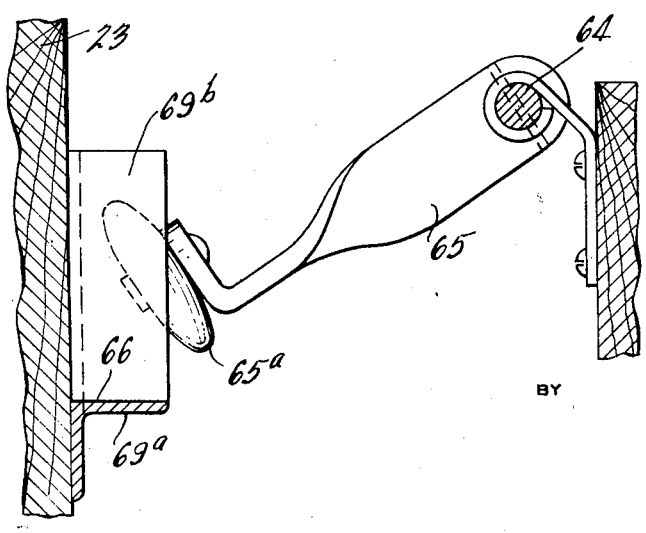

Figure 4 is a sectional plan of an upper corner of the stairway when extended as on line 4—4 of Figure 5;

Figure 5 is a sectional side elevation thereof on line 5—5 of Figure 4;

Figure 6 is a section on line 6—6 of Figure 1;

Figure 7 is an enlarged side elevation, partly in section, of the connection of the panel supporting arms to the panel;

Figure 8 is a section on line 8—8 of Figure 7;

Figure 9 is an enlarged elevational view of the stopping and reversing switch with its cover removed and showing the switch operating device, the parts being shown with the switch in one of its positions;

Figure 10 is a section on line 10—10 of Figure 9;

Figure 11 is a section along line 11—11 of Figure 9;

Figure 12 is a view similar to Figure 10 showing the stopping and reversing switch and operating part in the other of its positions;

Figure 13 is a view similar to Figure 11 with the parts in positions corresponding to Figure 12;

Figure 14 is a section on line 14—14 of Figure 13;

Figure 15 is a section on line 15—15 of Figures 9 and 11;

Figure 16 is a section on line 16—16 of Figure 9;

Figure 17 is an enlarged section on line 17, 17 of Figure 1;

Figure 18 is an enlarged elevation of the panel-actuated control device;

Figure 19 is a section on line 19—19 of Figures 1 and 18;

Figure 20 is a section along line 20—20 of Figure 18;

Figure 21 is a section along line 21—21 of Figure 5;

Figure 22 is a section along line 22—22 of Figure 21;

Figure 23 is a section along line 23—23 of Figure 21; and

Figure 24 is a diagram of the wiring connections.

Referring to the drawings, the numeral 20 designates a stairway opening defined by a frame in a ceiling between the floors of a building. A panel 21 is hinged as at 22 at one end of said opening, said panel being adapted to close the opening when the stairway is retracted. (See Figure 3.) A stairway 23 of suitable construction may be arranged to be moved between a retracted position above the opening (Figure 3) to an extended position of use (Figure 1) as by being slidably mounted on brackets 24, 24 hinged at 25, 25 on brackets 26, 26 secured to the end of the opening frame above the panel hinges 22, tongues 27 on brackets 24 having sliding fits in grooves 28 in the sides or stringers of stairway 23. This stairway is also preferably slidably connected to the free end of the panel to swing with the panel and to slide thereon between its retracted and extended positions as by provision of rollers 29, 29 journaled in brackets 30, 30 attached to the upper side of the panel 21 and on which the stringers of the stairway bear (see Figure 6) and tongues 31 swiveled onto brackets 30 as at 32 and having sliding fit in grooves 28 of the stair structure. The stair structure may include a hand rail 33.

For operating the stairway, a motor 24 is provided, preferably of the electrically reversible repulsion induction type, this motor preferably being removably supported on end on a bracket 35 arranged over one corner of the opening 20 and having its shaft 34$^a$ formed on its end with a polygonal stud 34$^b$ arranged to engage in a polygonal socket 36$^a$ in a driven shaft 36. (See Figures 4 and 5.) This construction facilitates removal of the motor for repairs or replacement. Shaft 36 is journaled in bearings 37, 38 secured in the corner of the opening 20 beneath the motor and has a worm 39 thereon meshed with a worm gear 40 secured on a transverse drum shaft 41 journaled in bearings 42, 42 at the sides of opening 20. Shaft 41 extends under the stair stringers.

Drums 43, 43 are arranged on shaft 41 at the sides of the stair structure and cables 44, 44, one end of each of which is secured on each drum are wound thereon and extended from the drums over sheaves 45, 45 journaled on brackets 46 mounted at the sides of opening 20 toward the opposite end thereof. From sheaves 45, the cables 44 are extended under sheaves 47, 47 journaled on brackets 48, 48 (Figure 6) which are swiveled as by mounting on a shaft 49 journaled in bearings 50, 50 on the upper side of panel 21 adjacent its free end. From sheaves 47 the cables 44 are extended about sheaves 51, 51 journaled onto the under side of the stair stringers on brackets 51$^a$ at the sides thereof, guards 51$^b$ being arranged about the outer side of sheaves 51. From sheaves 51 the cables are extended up through spring barrels 52 secured on the under side of the stair structure (Figure 2$^a$), the ends of the cables being secured to plates 53 slidable in said barrels and normally urged upwardly of the barrels by comparatively long compression springs 54 arranged in the barrels.

To supply electricity to motor 34 the main leads are brought to the installation by a conduit 55, these leads being designated L1, L2 in the diagrammatic showing of the wiring in Figure 24. Conduits 56 and 57 are extended from single-pole double-throw switches 58 and 59 respectively on the upper and lower floors and connections to the motor are made through a pair of reversing switches 60$^a$, 60$^b$ arranged as a unit 60 preferably on one side of the opening 20, a lead conduit 61 extending from one of the switches 60$^a$ to the motor. The various connections include a lead 58$^c$ from main lead L2 to switch 58, two leads 58$^a$, 58$^b$ from this switch to the central points of switch 60$^b$, two leads 59$^a$ and 59$^b$ from end points of switch 60$^b$ to switch 59, a lead 59$^c$ to one end point of switch 60$^a$, a lead 34$^c$ from the adjacent end point of said switch to the starting coils of motor 34, a lead 34$^d$ from the starting coil of the motor to main lead L1, a lead 34$^e$ from one center point of switch 60$^a$ to the starting coil of the motor 34, and a lead 34$^f$ from the starting coil to the other center point of switch 60$^a$. Leads 34$^c$ and 34$^d$ are designated R in the diagram as connections to the running coil of the motor and leads 34$^e$ and 34$^f$ are designated S as connections to the starting coil thereof.

The switches 60$^a$ and 60$^b$ are of the reversing type and arranged as a unit to be simultaneously actuated preferably by a single rock shaft 60$^c$. The connection between the switches and the rock shaft consists of a crank 61 connected by a pitman 62 with a crank 63 secured on rock shaft 64 which preferably is arranged along one side of opening 20 as by being journaled in bearing brackets 64$^a$, 64$^a$. This shaft is arranged to be rocked in one direction by movement of the stairway to its extended position by provision of an arm 65 thereon on which a roller 65$^a$ may be journaled so as to extend into the path of a cam plate 66 which may be affixed to one side of the stair structure adjacent its upper end, this cam plate having a straight portion 69$^a$ for engaging the roller 65$^a$ to swing arm 65 and an inclined portion 69$^b$ for holding the arm 65 in the position in which it is swung to prevent direct actuation of the switches 60$^a$ and 60$^b$ when the stair structure is extended (see Figures 4, 5 and 17).

The rock shaft 64 is also arranged to be rocked in the other direction as the panel 21 swings shut when the stairway is retracted by the provision of an arm 70 secured thereon and having a roller 70$^a$ thereon arranged to be engaged by a wedge member 71 pivoted at 72 on a plunger 73 vertically slidable in a bearing bracket 74 (see Figures 18 and 19). An inner face 71$^a$ on wedge member 71 is arranged to cooperate with a surface 74$^a$ during the travel of said plunger to and from its lowermost position to adjust and hold the wedge member 71 in position for actuating the arm 70 when the plunger is raised and a pin 75 is provided on the plunger to engage under an edge of the wedge member to prevent outward pivotal movement thereof from its vertical position. The plunger 73 is freely slidable in its bearing and is adapted to drop down by gravity to project below opening 20 when the panel is open as shown in full lines in Figure 19 and when the stairway is extended the plunger is in this position with the arm 70 adjacent the upper end of the face 74$^a$ with the wedge member 71 between the surface 74$^c$ and the arm. The plunger is thus adapted to be actuated upwardly by closing of the panel and in turn to swing the arm 70 to the dotted position shown in Figure 13, thus rocking shaft 64. The pivoting of the wedge member 71 on the plunger permits free descent of the plunger without danger of its becoming bound since if the corner 71$^b$ of the wedge engages the roller 70$^a$ on the descent of the roller the wedge member 71 will swing inwardly (see intermediate dotted line position of wedge in Figure 19) so as freely to clear roller 70$^a$ allowing free descent of the plunger. This control device as will be apparent prevents direct actuation of rock shaft 64 when the panel is shut.

To limit movement of the stairway to its extended position and to form a support for the upper end thereof, hook members 76, 76 are provided on the under side thereof at the top to engage over the drum shaft 41. Limiting of movement of the stairway to its retracted position on the panel is accomplished by provision of shoulders 77 defined by brackets 51$^a$ adjacent the lower ends of the stair structure adapted to engage the lower edges of brackets 30 on the panel 21.

The operation of the stairway requires first the lowering of the panel, then the extension of the stair structure to the floor, then the retraction of the stair structure on the panel and finally closing of the panel. To prevent closing of the panel until the stair structure is fully retracted, either one or a pair of arms 78 are provided. These arms are pivoted at 79 on vertically adjustable members 80, 80 (see Figure 2) arranged in housings 81, 81 affixed to the sides of opening 20 adjacent the end thereof opposite the end at which the panel is hinged, the pivot pins or bolts 79 for the arms extending through slots 82 in the housings and the members 80 being adjustable by screws 83, 83 journaled in the top of the housings and threaded through members 80, this adjustment being provided to accurately adjust the stairway to floors of buildings of different ceiling heights. At their lower ends the arms 78 are pivotally connected to members 84 slidable along tracks 85 arranged along the upper side of panel 21 adjacent its side edges, anti-friction rollers 84$^a$ being provided thereon to roll in said tracks. A pin 86 is provided in the tracks 85 to limit downward movement of arms 78 when the stairway is extended so that said arms will be in positions slightly below a dead center line through pivots 79 perpendicular to the door. Accordingly when the stairway is being retracted on the panel the arms 78 are adapted to hold the panel down. Lugs 87 secured on the sides of the stair structure are provided to engage with studs 88 projecting inwardly from arms 78 to move said arms back through their dead center positions as the stairway is moved to its retracted position on the panel, this permitting the panel to swing to closed position. Either lugs 87 or studs 88 or both may have rubber sleeves thereon as indicated at 87$^a$ to provide a noiseless bumper.

A further control on the motor 34 may be provided if desired to reduce as much as possible the travel thereof after the power is disconnected. Such a control may comprise a suitable brake 89 arranged in a housing on top of motor 34 (see Figure 5). This brake is best seen in Figures 21, 22 and 23 and includes a drum 91 secured on shaft 34$^a$, a pair of brake shoes 92, 92 cooperating with the drum, these being pivotally mounted on levers 93, 93 as at 92$^a$, 92$^a$, the levers 93 being pivoted at 93$^a$, 93$^a$. A spring 94 is arranged between levers 93 at one end to normally hold the brakes applied. The other ends of the levers are each connected to a core 95 slidable in a bore 96 in a solenoid coil 97, the cores 95 being arranged to be drawn inwardly of the coil when electricity is supplied thereto to release the brakes. The coil 97 may be arranged in parallel relation with the motor 34 in the power circuit to be energized whenever the motor is running as by a lead 97$^a$ connecting one side of the coil to lead L1 and a lead 97$^b$ connecting the other side of the coil to the connection 59$^c$ between switch 59 and switch 60$^a$.

While two standard reversing switches operable in unison have been successfully used in the stopping and reversing switch box 60, the preferred switch construction for this use is illustrated in Figures 9 to 16 and is of a construction especially adapted for the present use.

This improved switch device comprises a rock shaft 60$^c$ journaled on a rod 100 in casing 60 and having non-rotatably mounted thereon pairs of diametrically opposite conductor prongs 101, 102, 103 and 104, which may be formed on conductor discs 105 (Figure 14) clamped between discs 106, 107 of insulating material, one of which may be formed with an integral bushing 106$^a$ to insulate said conductor discs from shaft 60$^c$. A brass bushing 106$^b$ is arranged about the bushing 106$^a$ and supports the discs 105, the space between discs 106 and 107 being wider than discs 105. A certain freedom of movement of this disc is permitted to allow proper engagement of the prongs 101, 102, 103 or 104 with the terminal plate projection even though these may be slightly out of line. The conductor prongs are spaced along the shaft 60$^c$ by insulating sleeves 108, 108 and enlarged discs 109, 109 of insulating material are secured on the shaft 60$^c$ to embrace the conductor prongs to prevent arcing over.

Prongs 101, 102, 103 and 104 are arranged to cooperate alternately with aligned spaced projections A and B on terminal plates 110, 111, 112 and 113 respectively at the bottom of the casing 60 (see Figure 11) and respectively to connect the projections A and B of terminal plates 110 and 111 alternately with projections C and D, and C' and D' of terminal plates 114 and 115 and the projections A and B of terminal plates 112 and 113 alternately with projections C and D' and C' and D of terminal plates 116 and 117, terminal plates 114, 115, 116 and 117 being shaped and so provided with projections C' and D' as to present these for engagement by the prongs 101, 102, 103 and 104 in inverse arrangement to projections C and D (see Figure 15).

To rock shaft 60$^c$ between the two positions of the unit, it is provided with an arm 118 secured thereon which is provided with cam edges 118$^a$, 118$^b$ adapted to be engaged by lugs 119$^a$ and 119$^b$ respectively on a link 119 pivotally connected at one end as at 120 to a bell crank lever 121 pivoted at 122 and pivotally connected at the other end as at 123 to a bell crank lever 124 pivoted at 125.

Crank 61 is freely journaled on rod 100 and has a strong compression spring 126 pivotally connected thereto on an inwardly extending portion 127, the other end of said spring 126 being hingedly mounted on the outer end of arm 118 as at 128. The spring 126 may be supported by a rod 126$^a$, one end of the spring being against an abutment on the rod as at 126$^b$, this end of the rod extending loosely through an aperture in the outer end of arm 118, the other end of rod 126$^a$ sliding through a plate 126$^c$ swiveled on crank 61 and against which spring 126 bears. When crank 61 is down (Figure 10) spring 126 because of the position rod 126$^a$ assumes urges arm 118 and link 119 down, a stop pin 129 limiting downward movement of crank 61 and a stop pin 130 limiting downward movement of arm 118. This causes the free end of bell crank lever 121 to extend upwardly and it is arranged to be engaged by the inwardly extending portion 127 of crank arm 61 and to be depressed thereby when the crank 61 is raised.

It will be apparent that as the arm 61 is raised by actuation of rock shaft 64, the end 127 of arm 61 will be depressed and bell crank 121 also will be depressed causing link 119 to be elevated and in turn swinging arm 118 upwardly, this in turn raising the end 126$^b$ of the rod 126$^a$. The spring 126 accordingly will be compressed as this movement continues until points 127 and 128 approach a dead center position in alignment with the pivot rod 100. This positively starts to disengage the contacts to break any adhesion there may be, Immediately upon movement of the link 119 slightly beyond this dead center position spring 126 quickly and positively rocks arm 118 to its upper position (Figure 12) in which it is held by stop pin 131, a pin 132 being provided also to limit upward movement of crank 61. This effects a quick breaking of the contact at one side and a quick and positive closing of the switch at the other side. Arcing is accordingly reduced to a minimum.

It will be apparent that when crank 61 is rocked downwardly from its position in Figure 12 to its position in Figure 10 the reverse of the above operation will take place. It will thus be seen that a set of two reversing switches are combined in a single unit in such a way as to insure simultaneous and positive action thereof for the purpose of accurately controlling the operation of the stairway.

The stairway is normally in its retracted position shown in Figure 3. When it is desired to extend the stairway either of switches 58 or 59 is actuated to start motor 34 in a direction such that drums 43 will pay out cable. Accordingly the panel 21 will swing downwardly by reason of the unbalanced weight of it and the supported stair structure. As the panel swings down, the weight of the stair structure causes it to slide downwardly on the panel. The panel swings to its full open position and the free ends of arms 78 follow movement of the panel by sliding down along tracks 85, these moving below a dead center position by reason of their own weight. As the panel swings down the plunger 73 drops by its own weight to the full line position of Figure 19.

Shortly before the stair structure moves into its fully extended position, the cam plate portion 69ª of cam plate 69 engages the roller 65ª on arm 65 to turn rock shaft 64 thus simultaneously throwing both switches 60ª and 60ᵇ, thus disconnecting power from the motor and setting the connections for reverse operation thereof. The motor continues to run for a short period by its inertia, this period being considerably reduced if brakes 89 are employed.

It will be apparent that springs 54 will be compressed by the weight of the panel and stair structure as the stairway is being extended and should the motor slightly overrun after the stair structure is fully extended these springs will hold the cables taut. Should the stair structure not quite reach the floor when the motor stops the momentum or weight of the stair structure will be sufficient to further compress springs 54 slightly allowing the stair structure to move to the floor. Should this stair structure still fall somewhat short of reaching the floor, it will move immediately to the floor under the weight of a person stepping thereon.

When it is desired to retract the stairway, either of switches 57 or 58 is again actuated, starting the motor in the reverse direction and winding cable 44 onto drums 43. This first effects retraction of the stair structure onto the panel since arms 78 hold the panel open. As the stair structure moves into its fully retracted position on the panel lugs 87 engage pins 88 on the arms 78 swinging them back through their dead center positions and thereupon the panel swings shut.

As the panel swings shut, it engages plunger 73 whereby wedge member 71 swings arm 70 to the dotted line position thereof in Figure 19, thus rocking shaft 64 back to its original position and actuating switches 60ª and 60ᵇ to disconnect power from the motor and to reset the connections to their original position.

After the panel is shut continued rotation of the motor after the power is turned off causes additional compression in the springs 54 which serves to hold the panel tightly shut.

It will be apparent from the foregoing that a simple, effective, full-automatic stairway has been provided by the invention. Obviously modifications thereof may be resorted to without departing from the spirit thereof or the scope of the appended claims.

What is claimed is:—

1. A stairway comprising a panel adapted to be hinged in a ceiling opening, a stair structure extensible and retractible on the panel, power means for actuating the stairway including a power driven drum, a cable on the drum, said cable being connected to the panel and stairway to open and close the panel and to extend and retract the stair structure, means operable by extensions of the stairway to its position of use to stop the power means and set it to reverse the drum when again driven, and means operable by movement of the stairway to its retracted position to stop the power means and set it to drive the drum in its original direction when again driven, the cable connection between the drum and stairway including yielding means adapted to compensate for differential travel of the power means with respect to the stair structure.

2. A stairway comprising a panel adapted to be hinged in a ceiling opening, a stair structure extensible and retractible on the panel, power means for actuating the stairway including a power driven drum, a cable on the drum, said cable being connected to the panel and stairway to open and close the panel and to extend and retract the stair structure, means operable by extension of the stairway to its position of use to stop the power means and set it to reverse the drum when again driven, and means operable by movement of the stairway to its retracted position to stop the power means and set it to drive the drum in its original direction when again driven, and brake means operable as the power is disconnected to stop the drum.

3. A stairway comprising a panel adapted to be hinged in a ceiling opening, a stair structure extensible and retractible on the panel, power means for actuating the stairway including a power driven drum, a cable on the drum, said cable being connected to the panel and stairway to open and close the panel and to extend and retract the stair structure, means operable by extension of the stairway to its position of use to stop the power means and set it to reverse the drum when again driven, and means operable by movement of the stairway to its retracted position to stop the power means and set it to drive the drum in its original direction when again driven, the cable connection between the drum and stairway including yielding means adapted to compensate for differential travel of the power means with respect to the stair structure and brake means operable as the power is disconnected to stop the drum.

4. A stairway operable between a retracted position and a position of use, power-operated means for operating the stairway between these positions, means to connect power to said power-operated means, means operable by movement of the stairway into said positions to disconnect the power from said power operated means, and means operable by disconnection of the power from said means to apply a brake to said power operated means.

5. A stairway operable between a retracted position and a position of use, power-operated means connected to the stairway for moving the stairway between these positions, means to connect power to said power-operated means, and means operable by movement of the stairway into said positions to disconnect the power from said power-operated means, the connection between the power operated means and the stairway including yielding means to compensate for differential travel of the power-operated means and the stairway.

6. A stairway for a ceiling opening comprising a panel closure for the opening, a stairway movable to retracted position when the panel is shut, power means for closing the panel, means operable by closing of the panel to stop the power means, said means including a rock shaft, an arm on the rock shaft and having an engaging element thereon, a plunger adapted to fall by gravity to a position projecting below the opening when the panel is opened, and a pivoted wedge member on said plunger to engage said element on the arm to rock the shaft, said wedge member being adapted to be held in wedging relation to said element on the arm upon upward travel of the plunger and to pivot out of engagement with said element on the arm upon descent of the plunger.

7. A stairway including a stair structure movable in cooperation with a ceiling opening to an extended position, power means for operating the stairway to said extended position, means operable by movement of the stairway into said extended position to stop the power means, said means including a rock shaft having an arm thereon, and a cam on the stairway to engage said arm to rock the shaft.

8. A stairway including a stair structure movable in cooperation with a ceiling opening to an extended position, power means for operating the stairway to said extended position, means operable by movement of the stairway into said extended position to stop the power means, said means including a rock shaft having an arm thereon, and a cam on the stairway to engage said arm to rock the shaft, said cam including a portion adapted to permit continued travel of the stair structure after the rock shaft has been rocked but adapted to prevent operation of said rock shaft when the stair structure is extended.

9. In a motorized stairway device, a reversible motor, one or more manually operable switches to start the motor, and an automatic switch operable by the device to stop the motor and reverse the connections thereto, said automatic switch including in combination two reversing switches having movable elements mounted upon a common rock shaft for movement between two positions by which the connections to the switch are reversed, an arm for rocking said shaft, a crank and means engageable by the crank to move the arm when said crank is moved, said means including a shiftable member and spring means between the crank and the arm adapted to be compressed by movement toward a dead center position as the switch is actuated, said arm being free of said crank and said shiftable member so as to be suddenly and positively moved by said spring to its opposite position as said spring moves through the dead center position.

10. In a motorized stairway device, a reversible motor, one or more manually operable switches to start the motor and an automatic switch operable by the device to stop the motor and reverse the connections thereto, said automatic switch including in combination two reversing switches having movable elements mounted upon a common rock shaft for movement between two positions by which the connections to the switch are reversed, an arm for rocking said shaft, a crank and means engageable by the crank to move the arm when said crank is moved, said means including a shiftable member and spring means between the crank and the arm adapted to be compressed by movement toward a dead center position as the switch is actuated, said arm being free of said crank and said shiftable member so as to be suddenly and positively moved by said spring to its opposite position as said spring moves through the dead center position, said shiftable member including a link, spaced means on the link for positively engaging the arm, and bell-cranks supporting the ends of the link, said bell-cranks being engageable by said crank to shift said link.

11. In a motorized stairway device, a reversible motor, one or more manually operable switches to start the motor, and an automatic switch operable by the device to stop the motor and reverse the connections thereto, said switch including an element to be engaged and actuated as the stairway moves to a limited position, there being means associated with the stairway to engage and actuate said element, said automatic switch including in combination two reversing switches having movable elements mounted upon a common rock shaft for movement between two positions by which the connections through the switch are reversed.

FRANK E. BESSLER.